Patented June 3, 1952

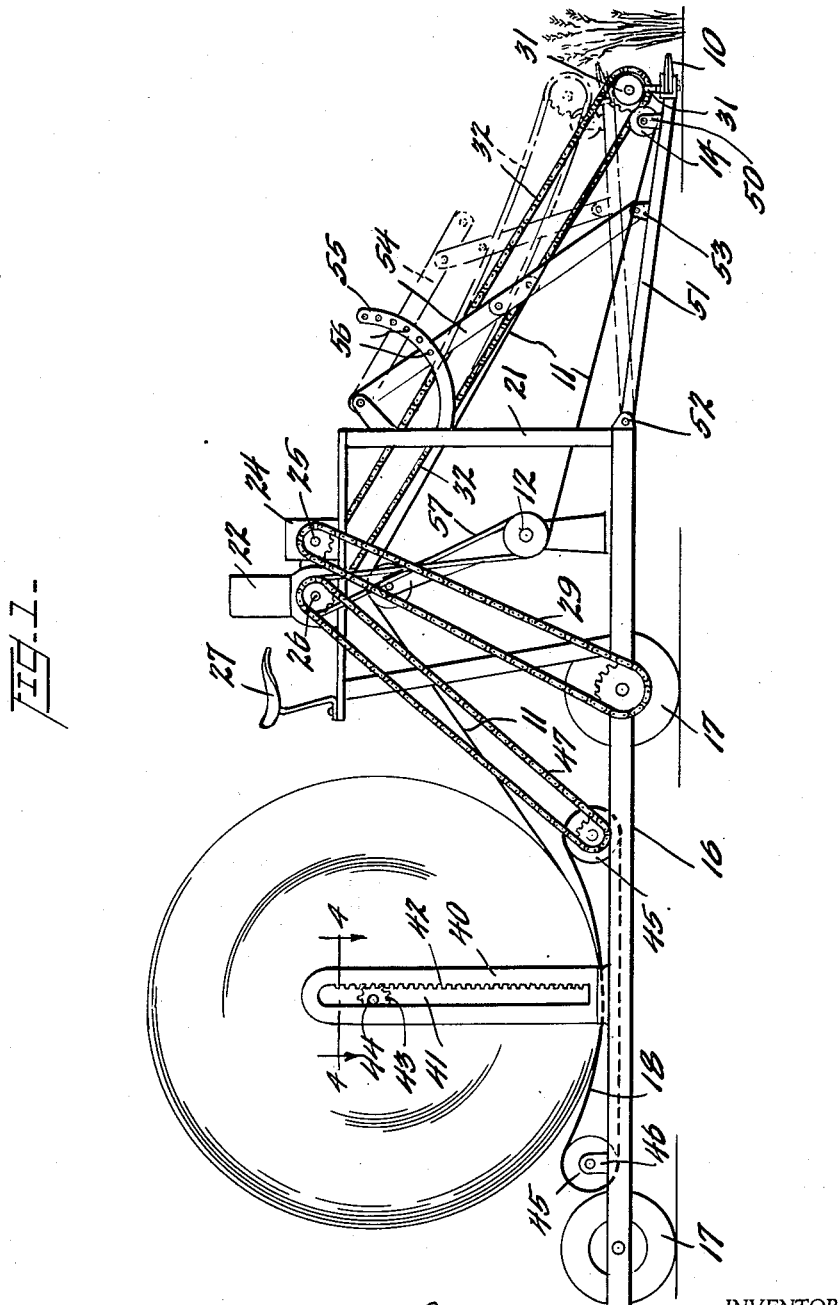

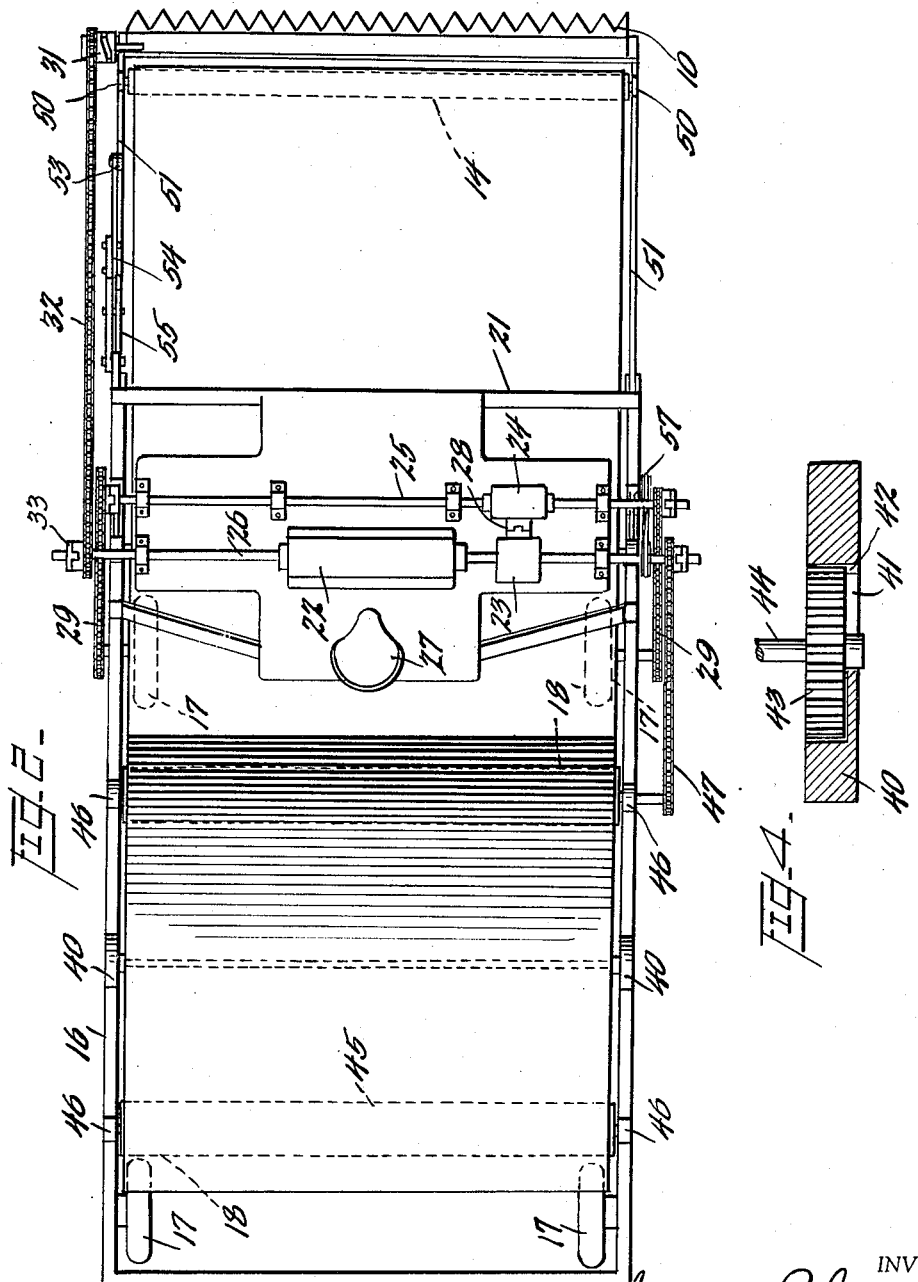

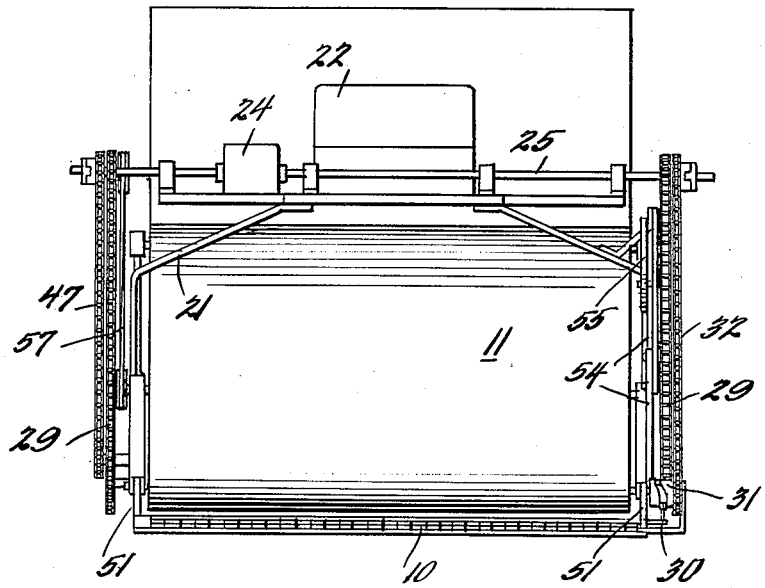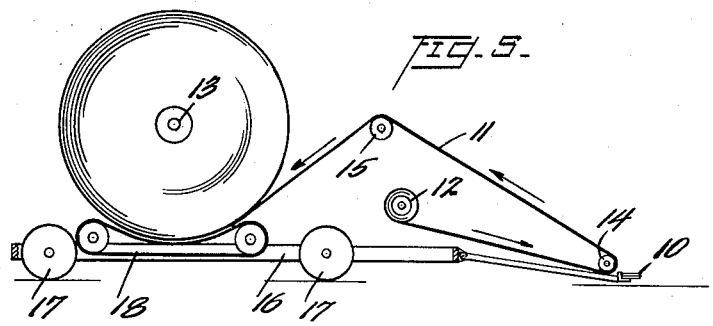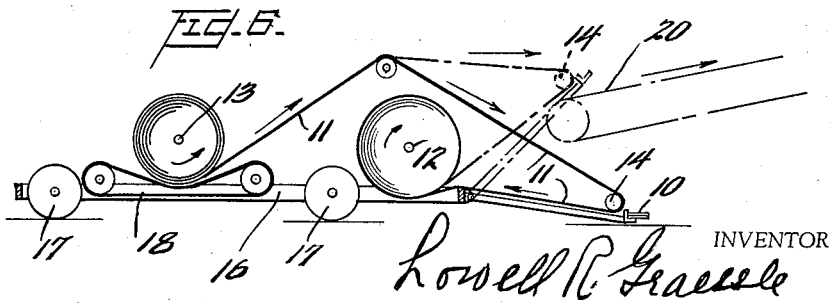

2,599,255

UNITED STATES PATENT OFFICE 2,599,255

HAY CUTTER AND LOADER

Lowell R. Graessle, Spencerville, Ohio

Application March 8, 1950, Serial No. 148,328

8 Claims. (Cl. 56—23)

The present invention relates generally to a crop gathering machine or apparatus and aims more particularly to provide a crop gathering machine which gathers the crop and which is also capable of delivering the crop at any desired point.

Generally, the present invention aims to provide a motor vehicle which carries a cutter bar for cutting the crop, with a travelling web which receives the crop from the cutter bar and which serves to store the crop upon a reel as the web winds on the reel. The same web, when reversed in its direction of travel, also serves to deliver the crop as desired.

Another object of the present invention is to provide a crop gathering apparatus of the type above described which may be operated by the engine of the motor vehicle both for receiving and storing the crop and for the subsequent delivery of the crop.

Other and further objects of the invention will be understood from the following detailed description thereof, reference being had to the accompanying drawings which illustrate one embodiment of the invention falling within the scope of the appended claims; it being understood that variations thereof may be devised by persons skilled in the art.

In the drawings, Figure 1 is a side view of the apparatus embodying the present invention; Fig. 2 is a plan view of the present apparatus; Fig. 3 is a front view thereof; Fig. 4 is an enlarged sectional view taken on line 4—4 of Fig. 1; Fig. 5 is a diagrammatic illustration of the principle of operation of the present invention as the crop is being cut and gathered, and Fig. 6 is an illustration of the invention as the crop is being delivered.

The principle of the present invention will be best understood referring at this point to Figs. 5 and 6 of the drawings. Fig. 5 illustrates the invention when it is embodied in combination with a sickle bar or crop cutter bar for the purpose of receiving the crop and storing the same. The cutter bar or other conventional crop gathering means is diagrammatically illustrated at 10 and the crop, which is cut as the machine advances, falls on and is received by the travelling web 11. This web is anchored at one end on reel 12 and at the other end on the reel 13. In its travel from the reel 12 to reel 13, it passes over the forward idler spindle 14 which is disposed immediately behind the cutter 10. The web 11 is then directed upward and passes over the intermediate idler 15. The entire organization thus far described is supported by the chassis 16 carrying the traction wheels 17. The reel 13 and the web 11 wound thereon, are supported peripherally by a pair of endless belts 18. When the machine is gathering a crop, power is supplied to one or both endless belts 18 and the reel 13 is thus rotated by virtue of the firm contact between the outer layer of the web 11 on the reel with the belts 18. The firm contact is caused by the weight of the reel, and the area of contact is large as shown. The web 11 is payed out by the reel 12 and as it passes over the spindle 14 it receives the crop continuously being cut and delivered by the sickle bar 10. The web 11 thus travels with the crop thereon and, as it is wound on the reel 13, it winds and retains the crop between successive layers of the web. The outer face of the web is in contact with the endless belt 18 which serves as a cradle to support the reel 13 together with the web and crop carried thereby, and, in addition, the belts 18 also serve to transmit power to the reel 13 so as to wind the web and crop thereon.

After the reel 13 is loaded to its maximum capacity, the vehicle may then travel to the point of storage of the crop and the apparatus is then operated to reverse the direction of travel of the web 11 and to deliver the crop as desired. For this purpose, the drive is de-clutched or otherwise disconnected from the belt 18 and a drive is provided for the reel 12. In addition, the idler 14 may be raised as shown in Fig. 6 so that it may deliver the crop to a receiving conveyor or to a storage bin as desired diagrammatically illustrated at 20. Thus, as shown in Fig. 6, web 11 unwinds from the reel 13 and carries the crop with it and as the web passes over the idler 14 the crop is delivered to the conveyor 20. The web then proceeds and winds onto reel 12.

Thus the essential principle of the present invention resides in providing a pair of reels and a travelling web which serves to receive the crop as it is cut and which also serves to store the crop by winding the web and a layer of the crop onto one of the reels. On reversing the direction of travel of the web, the crop may be delivered to another receiving or storing device while the web is being re-wound onto the front reel and is prepared thereby again to operate to receive and store the crop upon the rear reel.

The essential organization of the present invention which includes the web and front and rear reels may be mounted upon a tractor or other motor vehicle in any suitable manner. One manner of mounting the present apparatus on a tractor which is provided with a crop cutter or sickle bar is shown in Figs. 1–4, inclusive.

Referring to Figs. 1–4, the tractor there shown is provided with a chassis frame 16 carrying the traction wheels 17. The frame 21 is supported by the chassis and carries the engine 22, the gear case 23, the differential 24, the drive shaft 25, the motor shaft 26, and the operator's seat 27. The clutch 28 is disposed between the gear case 23 and the differential 24 and drive chains 29 transmit power from the engine 22 through the gear case and differential to one pair of wheels. The sickle bar 10 is intended to illustrate any one of a variety of cutters which may be mounted on a tractor to cut and gather crops. In the drawings, the sickle bar 10 is of the oscillatory type and will be seen as provided with an arm 30 which engages a rotary cam 31 driven by a chain 32 from the shaft 26. The clutch 33 is interposed between the shaft 26 and the chain 32. The organization thus far described is only diagrammatic and may obviously be replaced by any other suitable organization and is intended primarily to illustrate generally a tractor provided with a sickle bar for cutting the crop.

The present invention provides a simple organization which includes a travelling web for receiving, gathering, and temporarily storing the crop cut by the cutting bar 10. The web is mounted on a reel at each end and, as has already been explained, the web with the crop is moved from the forward to the rear reel for gathering and temporarily storing the crop and for delivery of the crop to a permanent storing point, the web is moved from the rear to the forward reel. The web and reels are, therefore, mounted on the tractor and receive power from the tractor engine directly or, if desired, from the tractor wheels or from a source of power provided for the purpose. In order to simplify the present showing, the embodiment of the invention illustrated operates by the power of the tractor engine 22. The reels carrying the web 11 are carried by the tractor chassis frame 16. For the support of the rear reel 13, the tractor frame 16 supports a pair of opposed rigid guide plates 40 best shown in Fig. 1 and shown in cross section in Fig. 4. Each guide plate 40 is provided with an elongated slot 41, one vertical edge of the slot being provided with teeth 42 to mesh with the teeth of the gear 43 carried by the shaft 44 of the reel 13. The gear 43 is preferably freely rotatable on the shaft 44. On its inner face each plate or guide plate 40 is provided with an elongated recess which parallels the slot 41 to receive and confine the gear 43.

The reel 13 with its shaft 44 extending at each end into slots 41 is guided by the guide plates 40 in its travel upward as it is being loaded and downward when it is being unloaded. The support for the reel is provided by the endless belts 18 which are carried by the pulleys 45 supported by the brackets 46 on the frame 16. A sprocket chain 47 transmits power from the engine to the endless belt 18 when the reel 13 is being loaded.

It will now be understood that as the tractor travels forward the sickle bar 10, which may be operated by the sprocket chain 32 to oscillate, cuts the crop and delivers the same to the travelling belt 11. At the same time the reel 13 is being rotated by the endless belt 18. As the reel 13 grows in diameter it rises with the endless belt 18 in firm contact with the belt 11. The rise of the reel 13 is guided by the slot 41 in the guide plates 40. If desired, the gear 43 and teeth 42 may be eliminated, and the ends of the shaft 44 of the reel 13 will then travel freely up the guide slots 41. For some purposes, it is desirable to have some additional support for the reel 13 and the engagement between the gear 43 and the teeth 42 provides such additional support. In such an organization, the weight of the reel 13 as it is being loaded is carried in part by the drive belts 18 and in part by the guide plates 40. However, when the gear 43 and teeth 42 are eliminated, the entire weight of the reel is supported by the drive belts 18.

The forward spindle 14 may be mounted in any desirable manner. However, under some conditions it may be desirable to raise the spindle 14 from its position immediately behind the cutter bar to a higher level for the unloading or delivery of the crop to a permanent storing point. This is desirable particularly to provide space for a receiving conveyor belt 20. For this purpose, the brackets 50 which support the spindle 14 are carried by a pair of arms 51 which are pivotally attached to the forward end of the frame 16 at 52. The arms 51 are provided at corresponding intermediate points with brackets 53. The linkages 54 are pivotally attached to the upper end of frame 21 and to the brackets 53. A pair of curved arms 55, each provided with a plurality of openings, is mounted on frame 21 as shown, for cooperation with the linkages 54 when the same are moved to the dotted line position shown in Fig. 1. These linkages 54 may be retained in the dotted line position by pins 56 and the spindle 14 is thus retained in the raised position.

In unloading, the sprocket chain 47 is declutched from the engine and the drive belt 57 is connected to the engine to wind the belt 11 onto the reel 12. The web 11, therefore, in this position delivers the crop to the permanent storage means or to another conveyor.

I claim:

1. The combination of a wheeled vehicle, crop gathering means carried by the vehicle at its forward end, a transverse spindle mounted on said vehicle immediately behind the gathering means, two rotatable reels mounted on said vehicle, and a web wound about one reel extending around the spindle and reversely around the other reel, the web, when traveling in one direction receiving a crop from said gathering means and storing the same on one reel and when travelling in the opposite direction delivering the crop from said one reel to other storage means.

2. The combination of a wheeled vehicle, crop gathering means carried by the vehicle at its forward end, a transverse spindle mounted on said vehicle immediately behind the gathering means, two rotatable reels, a web wound about one reel extending around the spindle and reversely around the other reel, and power means operatively connected to said reels to rotate the same and to cause the web to travel from either reel to the other as desired; the web, when travelling in one direction, receiving a crop from said gathering means and storing the same on one reel and, when traveling in the opposite direction, delivering the same from said one reel to other storage means.

3. The combination of a wheeled vehicle having a main body and a part extending forwardly therefrom, crop gathering means carried by said part, a transverse spindle mounted on said part adjacent the gathering means, two rotatable reels mounted on said vehicle, a web wound about one reel extending around the spindle and reversely around the other reel, the web, when traveling in one direction receiving a crop and storing the same on one reel, and, when traveling in the opposite direction, delivering the crop from said one reel to other storage means.

4. The combination of a wheeled vehicle having a main body and a forward portion pivotally mounted thereon, means operatively connected to said forward portion for adjusting the same to a desired position, crop gathering means carried by said forward portion, a transverse spindle mounted on the forward portion adjacent the gathering means, two rotatable reels mounted on said vehicle, a web wound about one reel extending around the spindle and reversely around the other reel, the web, when traveling in one direction, receiving the crop from the gathering means and storing the same on one reel, the web, when traveling in the opposite direction, delivering the crop from said one reel to other storage means.

5. The combination of a wheeled vehicle having a main body and a forward portion pivotally mounted thereon, means operatively connected to said forward portion for adjusting the same to a desired position, crop gathering means carried by said forward portion, a transverse spindle mounted on the forward portion adjacent the gathering means, two rotatable reels mounted on said vehicle, a web wound about one reel extending around the spindle and reversely around the other reel, and power means operatively connected to said reels to cause the web to travel in a desired direction, the web, when traveling in one direction, receiving a crop from the gatherer and storing the same on one reel and, when traveling in the opposite direction, delivering the crop from said one reel to other storage means.

6. A crop harvester comprising a wheeled vehicle, a crop cutter carried by the vehicle at its forward end operable to sever a crop near the ground as the vehicle moves forward, a transverse spindle mounted on said vehicle immediately behind the cutter, two rotatable reels mounted on said vehicle and a web wound about one reel extending around the spindle and reversely around the other reel, the web, when traveling in one direction, receiving the severed crop and storing the same on one reel, and, when traveling in the opposite direction, delivering the same to other storage means.

7. A crop harvester comprising a wheeled vehicle, a crop cutter carried by the vehicle at its forward end operable to sever a crop near the ground as the vehicle moves forward, a transverse spindle mounted on said vehicle immediately behind the cutter, two rotatable reels mounted on said vehicle, a web wound about one reel extending around the spindle and reversely around the other reel, and power means operatively connected to said reels to cause the web to travel in a desired direction, the web, when traveling in one direction, receiving the severed crop and storing the same on one reel and, when traveling in the other direction, delivering the crop to other storage means.

8. A crop harvester comprising a wheeled vehicle having a pivotally mounted forward portion, means operatively connected to said portion to adjust the same to a desired position, a crop cutter carried by said forward portion, a transverse spindle mounted on said portion adjacent the cutter, two rotatable reels mounted on said vehicle, a web wound about one reel extending around the spindle and reversely around the other reel, and power means operatively connected to said reels to cause the web to travel in a desired direction.

LOWELL R. GRAESSLE.

REFERENCES CITED

The following references are of record in the file of this patent:

UNITED STATES PATENTS

| Number | Name | Date |
| --- | --- | --- |
| 529,969 | Smith | Nov. 27, 1894 |
| 703,470 | Rembert | July 1, 1902 |
| 719,083 | Carter | Jan. 27, 1903 |
| 1,213,284 | Slathar | Jan. 23, 1917 |
| 1,272,724 | Taft | July 16, 1918 |
| 1,540,239 | Barker | June 2, 1925 |
| 2,048,940 | MacGregor | July 28, 1936 |
| 2,055,677 | Tallman et al. | Sept. 29, 1936 |
| 2,114,008 | Wunderlich | Apr. 12, 1938 |